United States Patent
Gerns

(10) Patent No.: US 7,959,959 B2
(45) Date of Patent: Jun. 14, 2011

(54) MANUFACTURED MEAT AND METHOD OF PRODUCTION THEREOF

(75) Inventor: Edwin Gerns, Queensland (AU)

(73) Assignee: ARG Trading Pty Ltd, Geebung (AU)

( * ) Notice: Subject to any disclaimer, the term of this patent is extended or adjusted under 35 U.S.C. 154(b) by 1185 days.

(21) Appl. No.: 10/467,203

(22) PCT Filed: Feb. 12, 2002

(86) PCT No.: PCT/AU02/00139
§ 371 (c)(1),
(2), (4) Date: Aug. 5, 2003

(87) PCT Pub. No.: WO02/063977
PCT Pub. Date: Aug. 22, 2002

(65) Prior Publication Data
US 2004/0062850 A1   Apr. 1, 2004

(30) Foreign Application Priority Data
Feb. 12, 2001   (AU) ........................ PR3026
Mar. 20, 2001   (AU) ........................ PR3844

(51) Int. Cl.
*A23L 1/31*   (2006.01)
*B65B 25/06*   (2006.01)
(52) U.S. Cl. ..................... 426/129; 426/574
(58) Field of Classification Search .......... 426/105, 426/129, 574, 134, 641, 513
See application file for complete search history.

(56) References Cited

U.S. PATENT DOCUMENTS

| | | |
|---|---|---|
| 1,971,460 A | 8/1934 | McKee |
| 2,419,424 A | 4/1947 | Staab |
| 2,553,113 A | 5/1951 | Ruggiero |
| 2,789,908 A | 4/1957 | Doepken ............ 99/107 |
| 3,307,955 A | 3/1967 | Pirtle |
| 4,806,373 A * | 2/1989 | Stumpf et al. ........ 426/266 |
| 5,328,712 A * | 7/1994 | Stevison et al. ...... 426/641 |
| 6,027,756 A * | 2/2000 | Spratt et al. ......... 426/281 |
| 6,168,822 B1 | 1/2001 | Reicks et al. |
| 2004/0062850 A1 | 4/2004 | Gerns |

FOREIGN PATENT DOCUMENTS

| | | |
|---|---|---|
| DE | 2047772 A | 9/1970 |
| FR | 923 094 A | 6/1947 |
| FR | 2411570 A2 | 7/1979 |
| FR | 2728435 | 6/1991 |
| FR | 2728435 * | 6/1996 |
| FR | 2728435 A1 | 6/1996 |

OTHER PUBLICATIONS

Lawrie, R.A. Lawrie's Meat Science. William Andrew Publishing 1998, pp. 146, 152, 192, 193, 236 and 240.*
In Japanese Patent Application 2002-563784: Instructions to JP Agent in response to first office action (believed to be an accurate representation of the arguments and amendments filed), May 2008, pp. 1-2.
In Japanese Patent Application 2002-563784: Translation of 2nd exam report, Aug. 5, 2009. pp. 1-3.
In Japanese Patent Application 2002-563784: Translation of response filed Nov. 11, 2009, pp. 1-2.
In Japanese Patent Application 2002-563784: Translation of Final office action, Apr. 27, 2010. pp. 1-3.
In Japanese Patent Application 2002-563784: Translation of response filed Jul. 23, 2010, pp. 1-4.

* cited by examiner

*Primary Examiner* — Kelly Bekker
(74) *Attorney, Agent, or Firm* — Peters Verny, LLP

(57) ABSTRACT

Methods for producing meat products with a bone flavour, and the meat products so produced, are provided. In exemplary methods a cured bone is secured with a binding to a de-boned and cured piece of meat, such as a piece of ham. The bone can be the one removed from the de-boned piece of meat, or can be a substitute bone. The de-boned piece of meat and the bone can be cured together or cured separately with the same or different cures prior to being secured together. An exemplary meat product comprises a de-boned piece of meat having an exterior, a bone positioned against the exterior, and a binding that secures the bone to the exterior of the piece of meat.

21 Claims, No Drawings

MANUFACTURED MEAT AND METHOD OF PRODUCTION THEREOF

RELATED APPLICATIONS

This application is a national stage entry under 35 U.S.C. 371 of PCT/AU02/00139 filed Feb. 12, 2002 claiming priority on Australian applications PR 3026 filed Feb. 12, 2001 and PR 3844 filed Mar. 20, 2001, the text of all of which is incorporated herein by reference.

BACKGROUND

This invention relates to manufactured meat and methods of production thereof.

This invention has particular application to the production of cooked ham, and the invention will be described hereinafter with reference to this application. However, it will be understood by persons skilled in the art that this invention may find application in the production of other manufactured meats such as bacons and other smoked or cured meats.

It is generally considered that leg ham on the bone is a superior product to boneless ham. In the production of boneless ham and other cured cuts, the brined and cured meat is boned out and the resulting cut is then usually wrapped in a cook-in wrap of polymer or net, or a smoke permeable cook-in wrap for hams or the like. The product is then steam cooked, smoked to cook, or is partially cooked by smoking followed by a heat cooking in a cook-in package, as the product requires.

The resulting product is relatively easier to carve than the bone-in product, and is appreciated by the market as having less waste. However, the boneless products are perceived to have inferior eating quality. Most persistently, the impression of the market is that the flavour of bone-out hams is of less quality that the flavour of bone-in ham.

In one aspect the present invention resides broadly in a method of production of manufactured meat including the steps of:
  providing an open-boned, boned-out cut;
  separately curing the cut and a bone;
  binding the cured bone on the outside of the cut in intimate contact with the flesh of the cut at the recess formed by the open boning thereof with a cook-in binding; and
  cooking the bound cut.

Conventional wisdom has it that the superior flavour of ham on the bone is predicated by the tissue-bound intimacy of the bone to the flesh throughout the curing and cooking process in terms of flavour development and thermal transfer through the bone. It has been suprisingly determined that, contrary to this conventional wisdom, essentially the same quality and flavour may be produced by a process in accordance with the present invention.

The cut may be any meat cut requiring to be boned. The bone may be sourced from the cut or may be from elsewhere on the same or another beast.

The boneless cut may be reshaped prior to curing. For example, the reshaping may be performed by mechanical stretching or rehanging. In the case of hams or the like, when the bone is removed the uncured or cured ham may advantageously be rehung or otherwise stretched. The ham muscle may be readily lengthened since there is no ham bone or associated tendons to support the muscle in shape. This hanging or stretching creates the appearance of a larger, longer and/or more streamlined appearance to the product.

The cure may be any suitable cure including but not limited to brining or pickling, sugar cure or the like, with or without saltpetre or other curing excipients. The cure may be the same or different as between the cut and the bone or bone substitute. Preferably, the cure for at least the cut is selected from cures conventionally used to cure the cut.

The binding may be by any suitable means at least in part dictated by the cooking process. The binding is advantageously selected from conventional cook-in bindings. For example, the binding may be by means of a natural or synthetic casing or film, net or cloth.

The cooking may be by means of one or more of smoking, thermal cooking such as roasting, steaming or boiling, or the like.

The intimate contact between the cured bone and the cured flesh may comprise reinsertion of the bone into the cavity of the boned cut.

The intimacy of contact between the flesh and the bone may be supplemented by the addition of a substance selected to enhance diffusion of the principles responsible for bone-enhanced flavour. For example, the bone and/or cut may be treated with a food acid or the like. The additive may also include or comprise a flavouring excipient such as a fruit juice, coulis or the like.

In a yet further aspect this invention resides broadly in a manufactured meat product when produced by any one of the foregoing methods of the invention.

The invention will be further described with reference to a preferred embodiment of the present invention, in accordance with the following example.

EXAMPLE

Three hams were selected for manufacture. Two were boned out and one was left on the bone. The three hams and the excised bones were pickled in brine and saltpetre in the conventional manner. The brining solution was supplemented with sugar and pineapple juice.

The cured bones were laid adjacent the excision slit in the cut in intimate contact with the flesh of one of the hams, and the whole cut was secured by cook-in elastic netting. The second boned out ham and the bone-in ham were similarly bound in netting to eliminate any variation in cooking occasioned by the netting. The respective cuts were then identically smoked to a cooked state in the conventional manner.

On a blind tasting, the boneless product was picked as such by a statistically significant proportion of tasters, whereas the bone-in ham and ham in accordance with the present invention were adjudged to be ham on the bone by a majority of tasters, with no statistically significant variation of opinion between the two products.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

The invention claimed is:

1. A method of production of manufactured meat including the steps of:
   providing an open-boned, boned-out whole cut of a meat animal;
   separately curing the cut and a bone;
   binding the cured bone on an external surface of the flesh of the cut proximate to the recess formed by the open boning thereof with a cook-in binding; and
   cooking the bound cut.

2. The method according to claim 1, wherein said bone is derived from said cut.

3. A method of production of manufactured meat comprising the steps of:
  providing a boned-out cut of a meat animal;
  providing a bone;
  separately curing the cut and the bone;
  binding the cured bone on the cut in intimate contact with the flesh of the cut at a recess formed by open boning of the cut, using a cook-in binding; and
  cooking the bound cut.

4. The method according to claim 1, wherein said cut is reshaped prior to curing.

5. The method according to claim 3, wherein said cut is reshaped by mechanical stretching or rehanging.

6. The method according to claim 1, wherein curing the cut and the bone comprises curing the cut and the bone using the same cure.

7. The method according to claim 1, wherein said cook-in binding is selected from the group consisting of a natural casing or film comprising film, net or cloth and a synthetic casing comprising film, net or cloth.

8. The method according to claim 1, wherein said cooking comprises one or more smoking steps followed by thermal cooking selected from roasting, steaming or boiling.

9. The method according to claim 3, wherein the intimacy of contact between the flesh of said cut and said bone is supplemented by the addition of a substance selected to enhance diffusion of the principles responsible for bone-enhanced flavor.

10. The method according to claim 9, wherein said substance is selected from food acids.

11. The method according to claim 9, wherein said substance comprises a flavoring excipient.

12. The method according to claim 10, wherein said substance comprises a flavoring excipient.

13. The method according to claim 11, wherein said excipient is selected from fruit juices or coulis.

14. A method of production of manufactured meat comprising the steps of:
  providing a cut of a meat animal;
  removing a bone from the cut;
  separately curing the cut and the bone;
  binding the cured bone on the cut in intimate contact with the flesh of the cut at the recess formed by the removal of the bone from the cut, using a cook-in binding; and
  cooking the bound cut.

15. The method according to claim 3, wherein said bone is selected from bones from a different individual of said meat animal than said cut.

16. A meat product comprising:
  a cured meat cut;
  a bone cured separately from the cured meat cut; and
  a cook-in binding configured to bind the bone to a cured meat cut to the bone, the bone being disposed on an external surface of the cured meat cut.

17. The meat product of claim 16, wherein the cured meat cut has been reshaped by mechanical stretching or hanging.

18. The meat product of claim 16, wherein the bone is derived from the same individual meat animal as the cured meat cut.

19. The meat product of claim 16, wherein the bone is derived from a different individual meat animal as the cured meat cut.

20. The meat product of claim 16 wherein the cured meat cut comprises ham.

21. The method of claim 1 wherein the cut comprises ham.

* * * * *